United States Patent
Moriya et al.

(10) Patent No.: US 8,381,755 B2
(45) Date of Patent: Feb. 26, 2013

(54) PRESSURE TYPE FLOW RATE CONTROL REFERENCE AND CORROSION RESISTANT PRESSURE TYPE FLOW RATE CONTROLLER USED FOR THE SAME

(75) Inventors: Shuji Moriya, Yamanashi (JP); Wataru Okase, Tokyo (JP); Tsutomu Shinohara, Osaka (JP); Nobukazu Ikeda, Osaka (JP); Michio Yamaji, Osaka (JP); Yasutaka Hayashi, Osaka (JP); Toshihide Yoshida, Osaka (JP); Yasuyuki Omata, Osaka (JP)

(73) Assignees: Fujikin Incorporated, Osaka (JP); Tokyo Electron Limited, Tokyo (JP)

( * ) Notice: Subject to any disclaimer, the term of this patent is extended or adjusted under 35 U.S.C. 154(b) by 0 days.

(21) Appl. No.: 13/483,159

(22) Filed: May 30, 2012

(65) Prior Publication Data

US 2012/0234406 A1    Sep. 20, 2012

Related U.S. Application Data

(62) Division of application No. 12/332,897, filed on Dec. 11, 2008, now Pat. No. 8,210,022.

(30) Foreign Application Priority Data

Dec. 11, 2007 (JP) ................. 2007-319977

(51) Int. Cl.
    *G05D 7/06* (2006.01)
    *G05D 7/00* (2006.01)
    *F16K 31/12* (2006.01)
    *F16K 31/02* (2006.01)
    *G01F 25/00* (2006.01)

(52) U.S. Cl. ........ 137/87.05; 73/1.25; 73/1.34; 73/1.35; 137/487; 137/487.5

(58) Field of Classification Search ............... 73/1.16, 73/1.25, 1.34–1.35; 137/87.05, 487–487.5; 251/12, 28–30.01
See application file for complete search history.

(56) References Cited

U.S. PATENT DOCUMENTS

| | | | |
|---|---|---|---|
| 5,816,285 A | 10/1998 | Ohmi et al. | |
| 6,119,710 A | 9/2000 | Brown | |
| 6,152,168 A | 11/2000 | Ohmi et al. | |
| 6,158,679 A * | 12/2000 | Ohmi et al. | 239/589 |
| 6,302,130 B1 | 10/2001 | Ohmi et al. | |
| 6,578,435 B2 | 6/2003 | Gould et al. | |
| 6,964,279 B2 * | 11/2005 | Ohmi et al. | 137/487.5 |

(Continued)

FOREIGN PATENT DOCUMENTS

| | | | |
|---|---|---|---|
| EP | 370871 A1 | | 5/1990 |
| EP | 824232 A1 * | | 2/1998 |

(Continued)

*Primary Examiner* — Thomas P Noland
(74) *Attorney, Agent, or Firm* — Griffin & Szipl, P.C.

(57) ABSTRACT

A pressure type flow rate control reference allows the performance of flow rate calibrations of a flow rate controller on all types of gases, including corrosive gases, at low costs, and also has excellent flow rate control accuracy. The pressure type flow rate control reference includes a pressure controller for adjusting the pressure of a calibration gas from a calibration gas supply source, a first volume provided on the downstream side of a pressure controller, a first connection mouth of an uncalibrated flow rate controller provided on the downstream side of the first volume, a reference pressure type flow rate controller connected to a second connection mouth on the downstream side of the uncalibrated flow rate controller, a second volume provided on the downstream side of a reference pressure type flow rate controller, and an evacuation device provided on the downstream side of the second volume.

2 Claims, 10 Drawing Sheets

U.S. PATENT DOCUMENTS

| | | |
|---|---|---|
| 7,059,363 B2 * | 6/2006 | Sugiyama et al. ..... 137/487.5 X |
| 7,108,009 B2 | 9/2006 | Ishida |
| 7,232,109 B2 * | 6/2007 | Driggs et al. .............. 251/129.1 |
| 8,104,323 B2 | 1/2012 | Yasuda |
| 8,240,324 B2 * | 8/2012 | Monkowski et al. .. 137/487.5 X |
| 2004/0154664 A1 * | 8/2004 | Ohmi et al. ................. 137/487.5 |
| 2006/0076060 A1 * | 4/2006 | Ohmi et al. ................... 137/334 |
| 2006/0207595 A1 * | 9/2006 | Ohmi et al. ............. 128/205.26 |
| 2007/0151321 A1 * | 7/2007 | Ohmi et al. ................ 73/1.34 X |
| 2007/0168150 A1 * | 7/2007 | Hirata et al. .................. 702/130 |
| 2007/0193628 A1 * | 8/2007 | Kannan et al. ............ 137/487.5 |
| 2007/0233412 A1 | 10/2007 | Gotoh et al. |
| 2011/0094596 A1 * | 4/2011 | Sugiyama et al. ..... 137/487.5 X |
| 2011/0265549 A1 | 11/2011 | Cruse et al. |

FOREIGN PATENT DOCUMENTS

| | | | |
|---|---|---|---|
| EP | 952505 A1 | * | 10/1999 |
| JP | 02076966 A | * | 3/1990 |
| JP | 07281759 A | * | 10/1995 |
| JP | 08042652 A | * | 2/1996 |
| JP | 10-055218 | | 2/1998 |
| JP | 11-063265 | | 3/1999 |
| JP | 2000-137528 | | 5/2000 |
| JP | 2004-226077 A | | 8/2004 |
| JP | 3580645 | | 10/2004 |
| WO | 2008-069227 A1 | | 6/2008 |

* cited by examiner

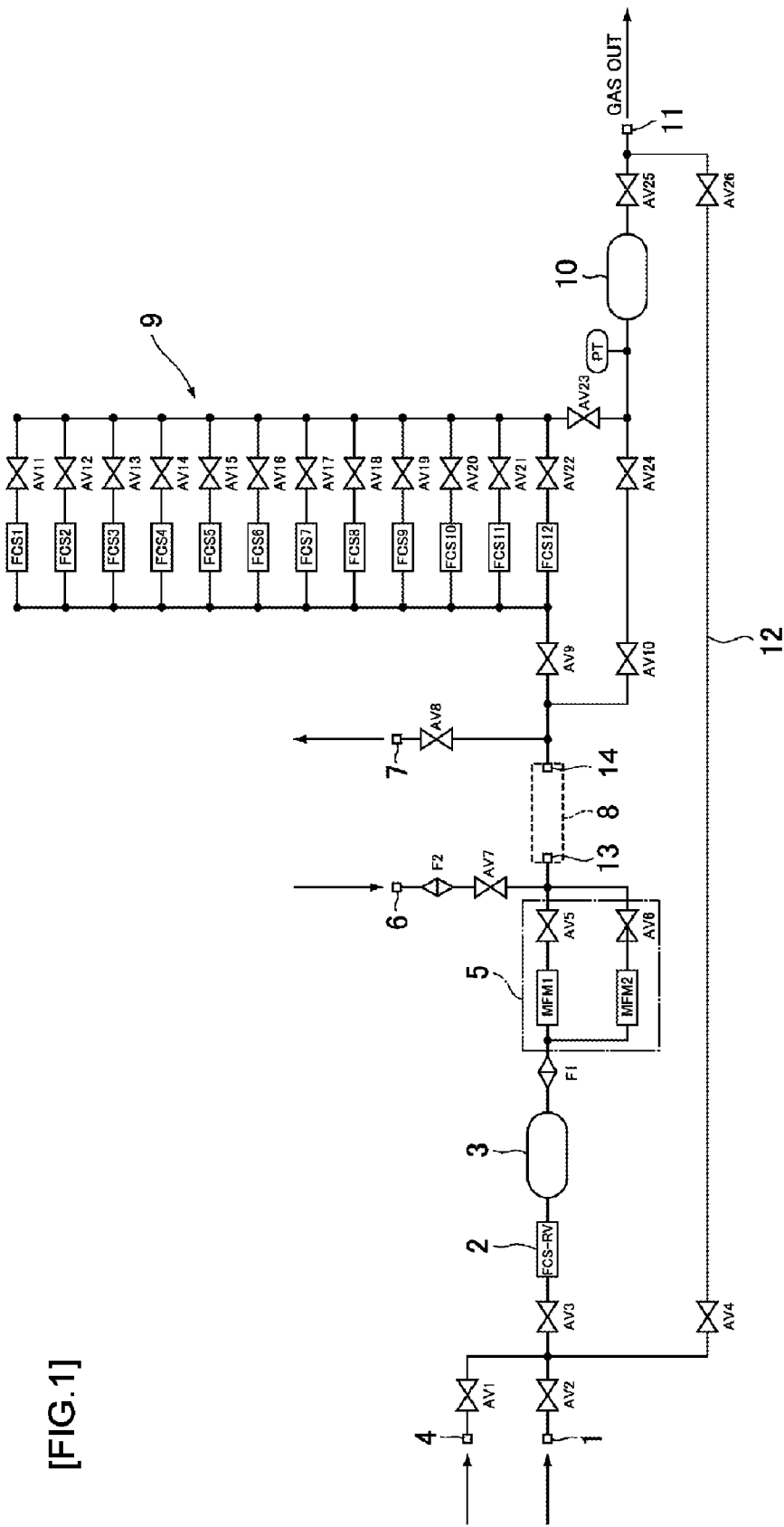
[FIG.1]

[FIG. 2]
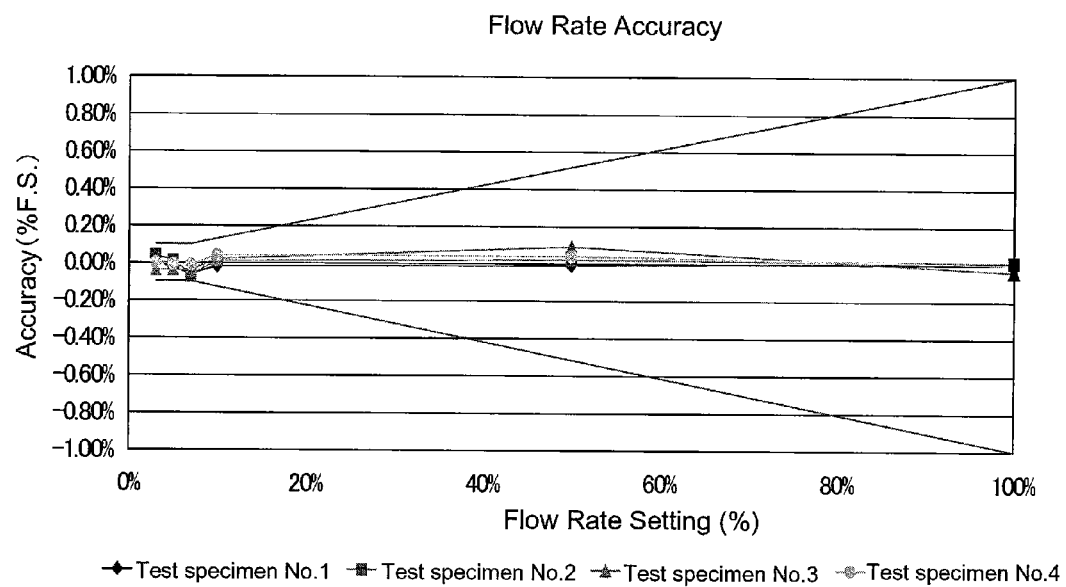

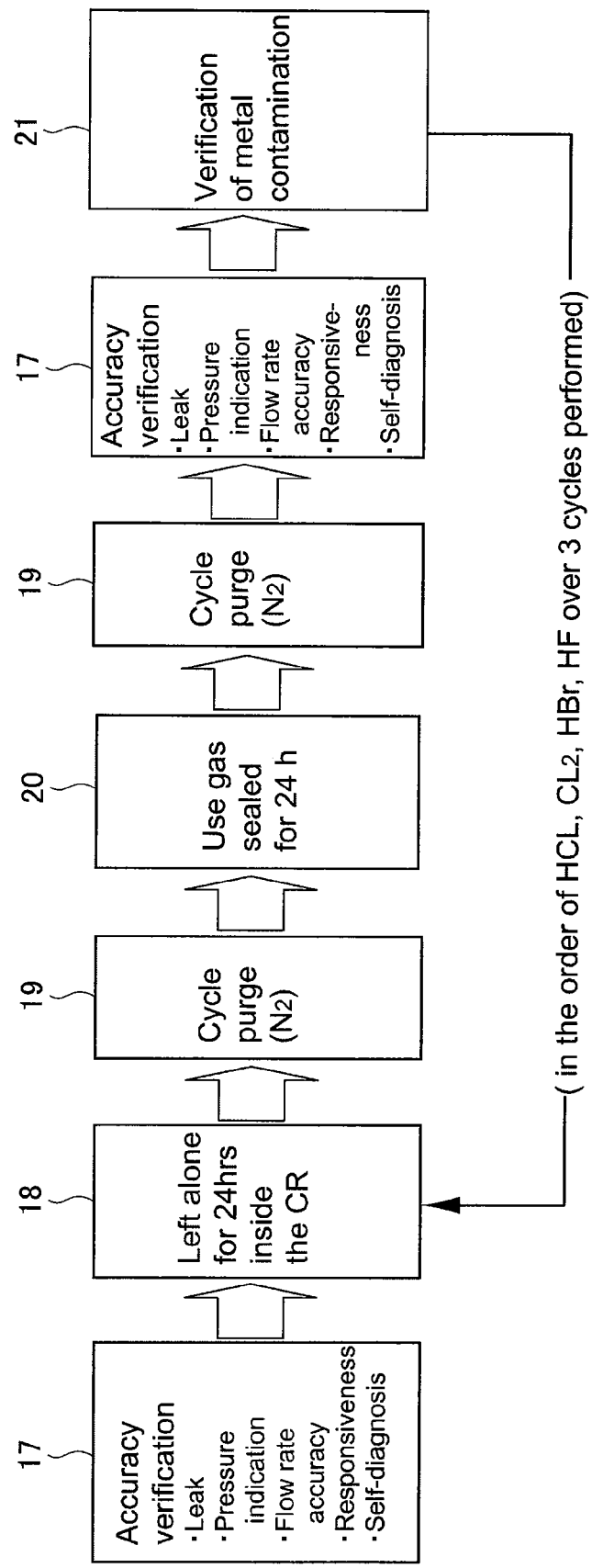
[FIG. 3]

[FIG. 4]
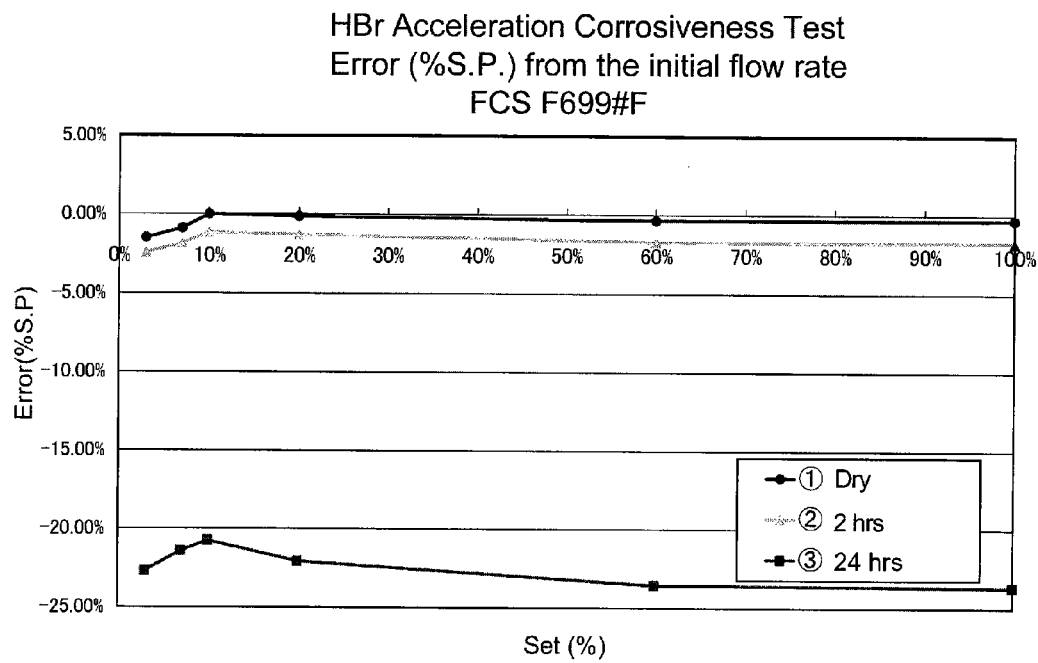

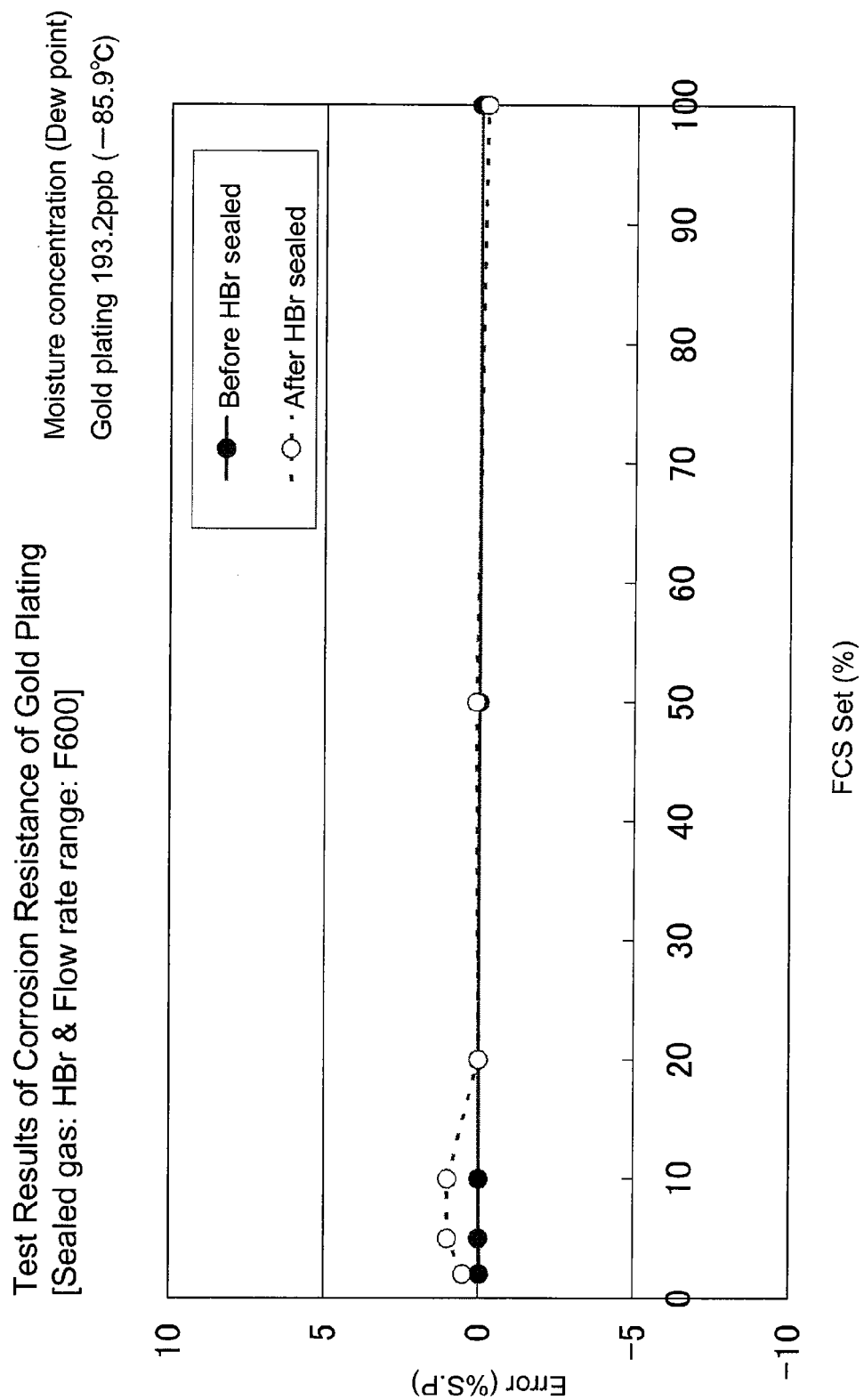
[FIG. 5]
Test Results of Corrosion Resistance of Gold Plating
[Sealed gas: HBr & Flow rate range: F600]
Moisture concentration (Dew point)
Gold plating 193.2ppb (−85.9°C)

[FIG. 6]
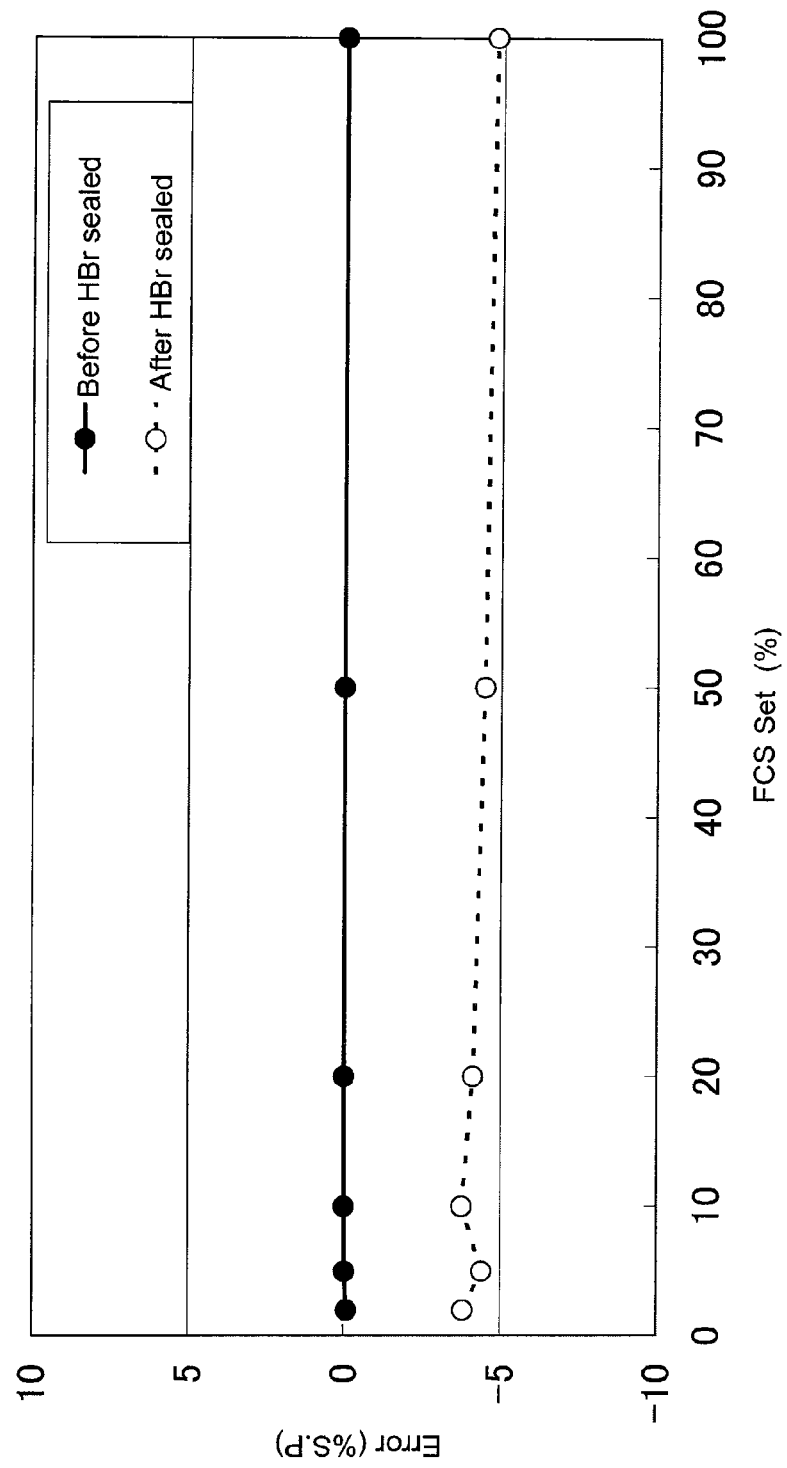

[FIG. 7]
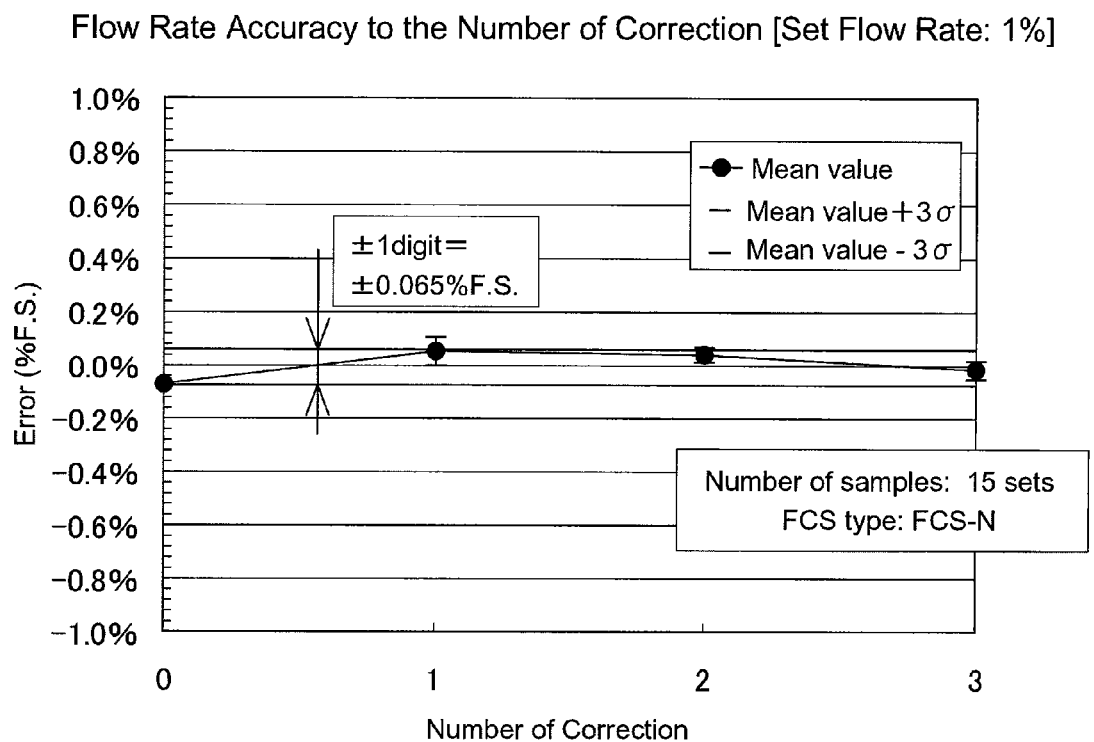
[FIG. 8]
Prior Art
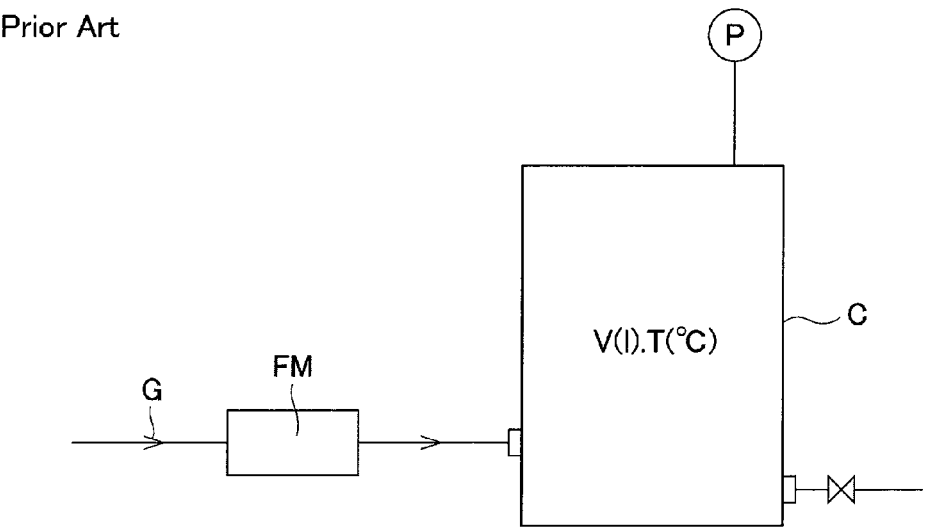

[FIG. 9]
Prior Art
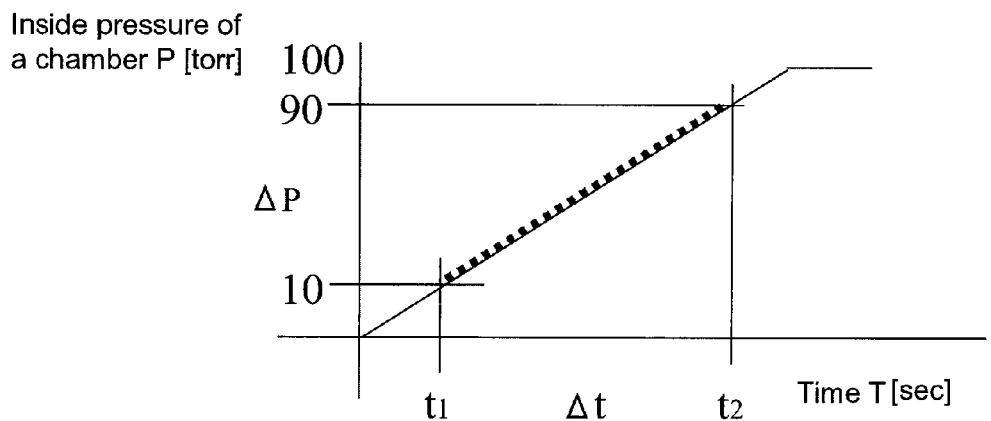
[FIG. 10]
Prior Art
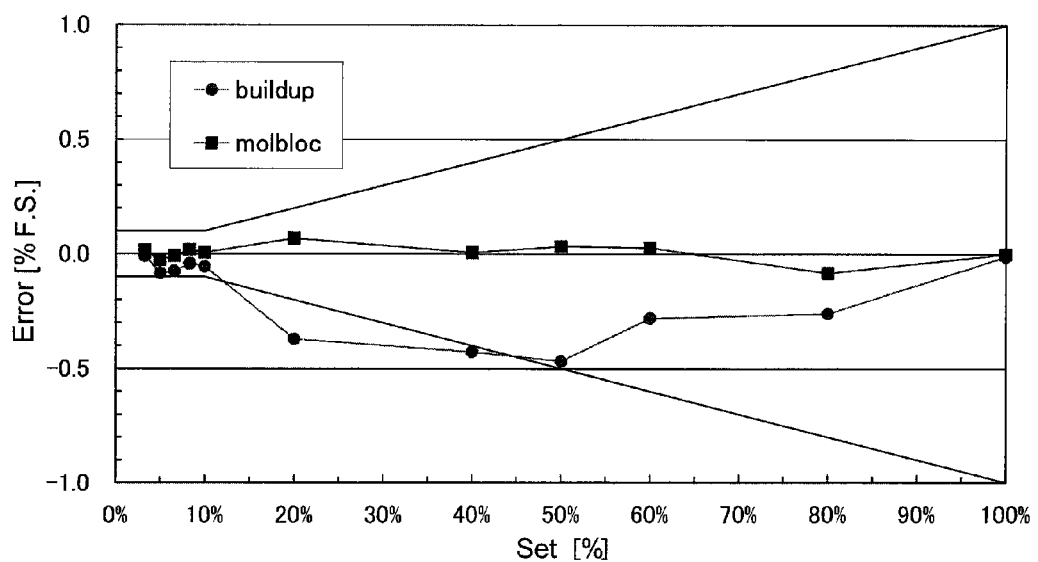

[FIG. 11]
Prior Art
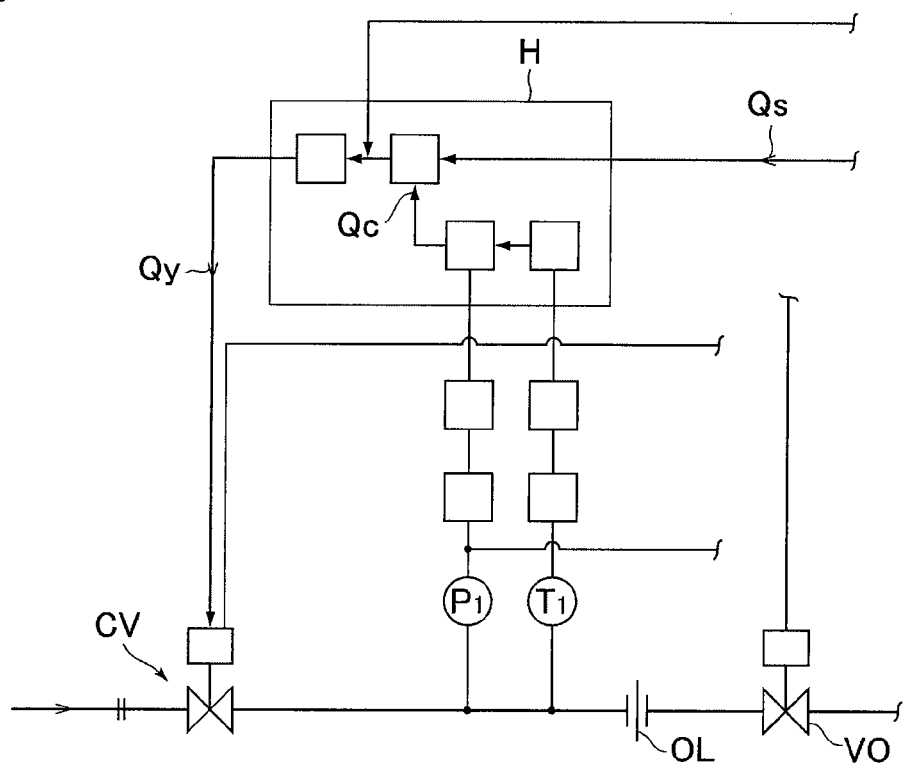

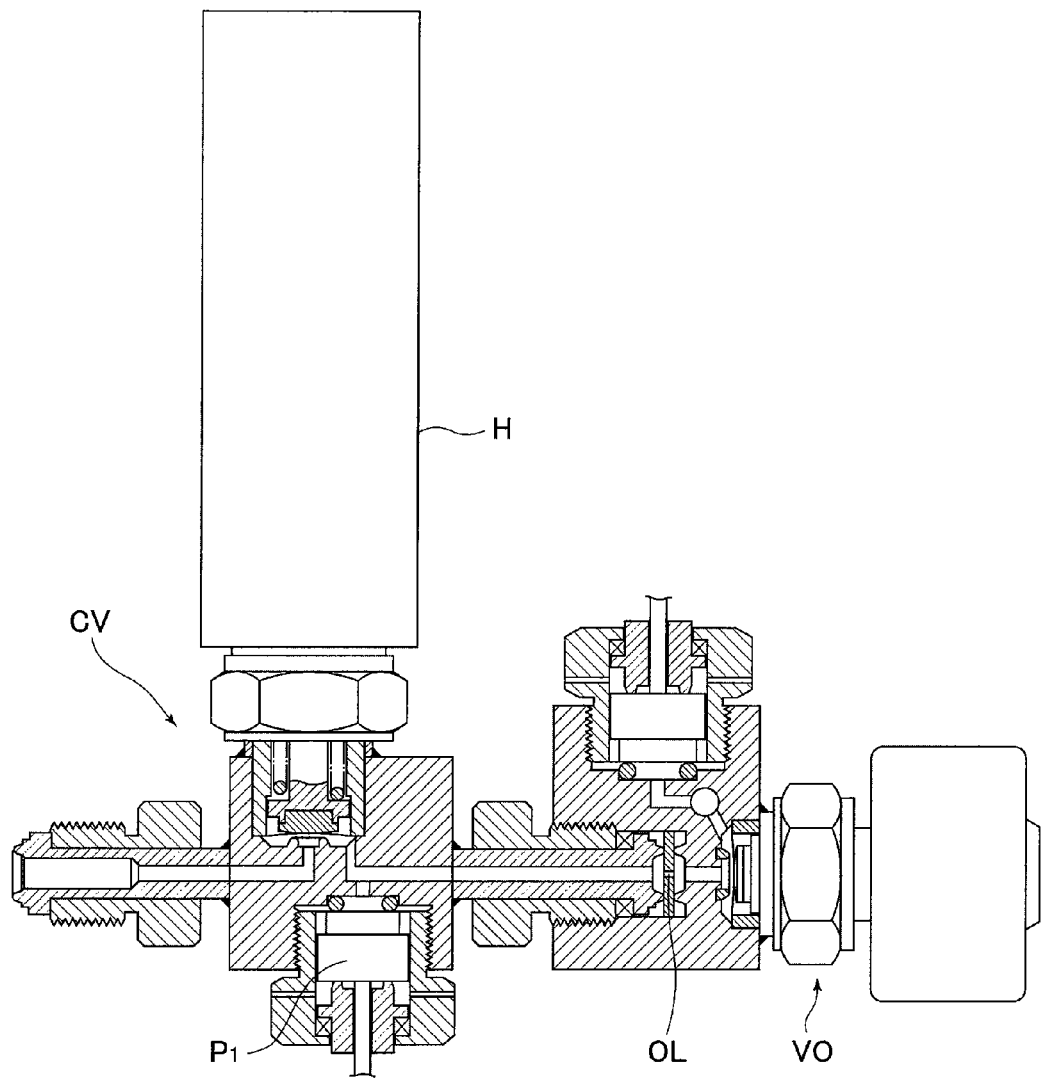
[FIG. 12]
Prior Art

PRESSURE TYPE FLOW RATE CONTROL REFERENCE AND CORROSION RESISTANT PRESSURE TYPE FLOW RATE CONTROLLER USED FOR THE SAME

This application is a divisional application of U.S. patent application Ser. No. 12/332,897, filed on Dec. 11, 2008, which claims priority on Japanese Patent Application No. 2007-319977, filed Dec. 11, 2007. The entire disclosures of the above patent applications are hereby incorporated by reference.

FIELD OF THE INVENTION

The present invention relates to a reference for calibrating various types of flow rate controllers used in semiconductor manufacturing facilities, pharmaceutical products manufacturing facilities, chemical products manufacturing facilities, and the like. The invention also includes a corrosion resistant pressure type flow rate controller used for the same.

BACKGROUND OF THE INVENTION

Thermal type flow rate controllers (MFC) and pressure type flow rate controllers (FCS) have commonly been used as a flow rate controllers for various kinds of process gas used in semiconductor manufacturing facilities. Of the two the pressure type flow rate controller has been more widely employed due to its excellent characteristics, such as responsiveness, measuring accuracy, service life, and maintainability, as well as its simplicity in structure.

Flow rate controllers are normally only shipped after flow rate calibrations are performed on each unit using a flow rate reference. Different types of references have been developed for flow rate calibrations. For example, in the Buildup Method/ROR Method, a gas is fed into a chamber and the flow rate of the gas is computed using the pressure of the gas accumulated in the chamber, in the Gas Weight Reduction Method gas accumulated in a chamber is discharged and the flow rate of the gas discharged is computed using the change in weight of the chamber, and similarly, in the Weight Method, gas is fed into a chamber and the flow rate of the gas is computed using the change in weight of the chamber.

Makers of flow rate controllers perform flow rate calibrations on their flow rate controllers by using the flow rate reference chosen at their discretion before the controllers are shipped to the end users. Therefore, once the production facilities choose a particular make of flow rate controller, it becomes impossible to employ a flow rate controller manufactured by another manufacturer when partial renovation or remodeling is conducted. In other words, even if a change is desired, the end user is limited to using the flow rate controller chosen by the manufacturer in the beginning. This makes it difficult to reduce installation costs and the like since each manufacturer has its own flow rate reference for calibrations. The use of the different flow rate references causes inconsistencies in the flow rate values obtained in actual measurements even if the flow rate controllers are manufactured with the same specifications. Therefore, in facilities such as semiconductor manufacturing facilities that require highly accurate flow rate control, it is, extremely difficult to employ flow rate controllers manufactured by different manufacturers at the same time.

As stated above, the buildup method or a weight method is normally used to obtain these flow rate references. For example, as illustrated in FIG. 8, according to the buildup method, first a gas G, having a set flow rate, is supplied into chamber C, having internal volume V, through flow rate controller FM, which performs flow rate calibrations. The relationship between the supply time t and internal pressure P of the chamber is obtained from the readout of a pressure gauge.

Next, as shown in FIG. 9, the pressure rise rate $\Delta P/\Delta t$ of the internal pressure of the chamber is calculated from the measurement results of the supply time t and internal pressure P. Then the flow rate Q (sccm) of the flow rate controller FM is computed using Equation 1 which uses the pressure rise rate $\Delta P/\Delta t$. Thus, the readout of flow rate controller FM is calibrated based on the computed value.

Equation 1

$$Q(sccm) \frac{1(atm)}{760(Torr)} \times 1000(cc/l) \cdot 60 \; (sec/min) \times \frac{273(k)}{(273+T)(k)} \cdot V(l) \times \frac{\Delta P(Torr)}{\Delta t(sec)} \quad (1)$$

However, there are problems with the buildup method. For example, the first problem is that accurate measurements of the gas temperature T inside chamber C are difficult. Namely, it has been found that a considerable gap in the measured value exists between the gas temperature T measured inside chamber C and the gas temperature T measured in the vicinity of chamber C. Further, it has been found that when the gas temperature T changes 1° C., the flow rate Q (sccm) varies approximately 0.33% S.P.

The second problem is the low measurement accuracy of the pressure gauge (Baratron), which causes fluctuation in the pressure rise rate $\Delta P/\Delta t$ each time a measurement is taken. In particular, each pressure gauge (Baratron) P is equipped with its own specific temperature characteristics and pressure rise characteristics (linearity). Thus, different pressure rise ranges (span of the pressure rise) and different measuring conditions result in different curves such as that shown in FIG. 9 As a result, the pressure rise rate $\Delta P/\Delta t$ widely fluctuates. Another difficulty is that as the flow rate of the flow rate measuring device becomes larger, a large-sized chamber C is required, and it takes a longer time to take a measurement if the chamber C is made smaller.

The third problem is that the flow rate values (calibrated flow rates) computed with the aforementioned Equation 1 turn out to be different each time actually measured. For example, even when the experiment system, flow rate, measurement time, measuring pressure range, and the like are exactly identical, a highly accurate flow rate calibration can not be expected because in reality the calibrated flow rate value varies only with a change of the flow rate range of the pressure type flow rate controller.

FIG. 10 shows one example of a test result of the flow rate calibration of a flow rate controller based on the buildup method. The figure shows that even when a calibration flow rate is set so that the flow rate error is zero at the flow rate setting of 100%, the error (% F.S.) becomes larger when the flow rate setting value SET (%) is varied.

In addition to flow rate references based on the buildup method, flow rate references based on gas weight have been developed. For example, in the gas weight reduction method, the weight of a gas supply source (a gas cylinder) is measured, and the gas flow rate Q (sccm) is obtained from the amount of weight reduction. In addition, there is a flow rate reference based on the weight method in which the gas flow rate Q (sccm) is obtained from the increased value of the weight of a chamber after gas is fed into the chamber.

However, obtaining a flow rate reference for when the gas weight reduction method or a weight method is employed requires a highly accurate weighing device. Among other problems, this causes the device to become bulky, and a longer time is required for the measurements.

As stated above, there are different types of flow rate references used for the flow rate calibrations of a flow rate controller depending upon the manufacturer of the flow rate controller. In addition, the accuracy of flow rate references during use have been found to be relatively low. This means that the values of flow rate measurements vary each time a different type (maker and model) of flow rate controller is used. For example, in fields such as semiconductor manufacturing, and the like for which finer processing is required, slight differences (errors) in the flow rate calibrations of a flow rate controller can cause a detrimental effect on the entire processing.

In semiconductor manufacturing facilities and the like, corrosive gases are widely used as a process gas, often causing errors with the flow rate controller due to the corrosiveness. This problem is detrimental not only to processing with a flow rate controller but also to the reference flow rate controller (master controller) used with the pressure control type flow rate reference. Therefore, when the gas used for the flow rate calibration is corrosive, most likely, the shape of the orifice of the aforementioned master controller becomes deformed, the dimensions of the internal diameter of the master become varied, and the orifice becomes clogged with the corrosive products. Thus the function of a master controller is ultimately lost.

Patent Document 1: Japanese Patent No. 3580645
Patent Document 2: Japanese Unexamined Patent Application Publication No. 11-63265
Patent Document 3: Japanese Unexamined Patent Application Publication No. 2000-137528

DISCLOSURE OF THE INVENTION

Object of the Invention

The object of the present invention is to solve the aforementioned problems with flow rate references based on the conventional buildup method, gas weight reduction method or weight method. In particular, the invention addresses the problem of low accuracy of the flow rate reference in use and the slight difference (errors) in flow rate control among flow rate controllers due to the different structures and models of flow rate references manufactured by the different makers of flow rate controllers, which adversely affects the semiconductor manufacturing process.

Another problem is the early stage deterioration of control accuracy of a flow rate controller through which a corrosive gas passes.

An object of the present invention is to provide a pressure type flow rate control reference and a corrosion resistant pressure type flow rate controller to be used for the same which make it possible to achieve flow rate calibration accuracy and consistency of flow rate controllers by means of developing a pressure type flow rate control reference by providing a pressure type flow controller having high flow rate accuracy and excellent operational stability as a reference flow rate controller (master flow rate controller).

SUMMARY OF THE INVENTION

The pressure type flow rate control reference of the present invention is characterized in that it comprises:

a pressure controller for adjusting the pressure of a calibration gas from a calibration gas supply source, a first volume provided on the downstream side of a pressure controller, a first connection mouth of an uncalibrated flow rate controller provided on the downstream side of the first volume, a reference pressure type flow rate controller connected to a second connection mouth on the downstream side of an uncalibrated flow rate controller, a second volume provided on the downstream side of a reference pressure type flow rate controller, and an evacuation device provided on the downstream side of the second volume.

The second embodiment of the pressure type flow rate control reference of the present invention is characterized in that it is made so that a reference pressure type flow rate controller is formed by connecting a plurality of reference pressure type flow rate controllers in parallel.

The third embodiment of the pressure type flow rate control reference of the present invention is characterized in that it is made so that the fluid inlet side and outlet side of a reference pressure type flow rate controller are directly connected with a bypass circuit.

The fourth embodiment of the pressure type flow rate control reference of the present invention is characterized in that it is made so that a thermal type mass flow rate gauge is installed between a volume and a connection mouth on the upstream side of an uncalibrated flow rate controller.

The fifth embodiment of a pressure type flow rate control reference of the present invention is characterized in that it includes a vacuum pump or a vacuum chamber is used as an evacuation device.

The sixth embodiment of a pressure type flow rate control reference of the present invention is characterized in that it is made so that a corrosion resistant reference pressure type flow rate controller with which a gold-plated layer is formed on the entire surface of the inner fluid contacting part is used as the reference pressure type flow rate controller.

The first embodiment of a corrosion resistant reference pressure type flow rate controller to be used for a pressure type flow rate control reference of the present invention includes:

an orifice, a control valve provided on the upstream side of the orifice, a pressure detector provided between the control valve and orifice, and a computation control device wherein a flow rate Q is computed by Equation $Q=KP_1$ (where K is a constant) from the pressure $P_1$ detected with the pressure detector and the difference between a flow rate command signal Qs and the flow rate signal Q is made to be control signal Qy which is outputted to a driving part of the control valve; and constituted so that the pressure $P_1$ on the upstream side of the orifice is adjusted by opening/closing of the control valve when the ratio of the pressure $P_1$ on the upstream side of the orifice and the pressure $P_2$ on the downstream side are maintained below a critical pressure ratio of the fluid to be controlled, thus controlling the flow rate Q of the fluid on the downstream side of the orifice, and wherein a gold-plated layer is formed on the entire surface of the inner fluid contacting part of the reference pressure type flow rate controller.

The second embodiment of the corrosion resistant reference pressure type flow rate controller to be used for the pressure type flow rate control reference of the present invention is characterized in that the gold-plated layer is 2~5 μm thick.

Effects of the Invention

The pressure type flow rate control reference of the present invention is made so that a reference pressure type flow rate controller or a plurality of reference pressure type flow rate controllers connected in parallel is/are utilized as the master reference flow rate controller. As a result, fully utilizing the excellent flow rate control accuracy of the pressure type flow rate controller, it becomes possible that a flow rate reference for the flow rate calibration having a flow rate control accuracy lower than ±0.25% S.P. is manufactured at very low costs.

Also, since a reference pressure type flow rate controller having high flow rate control accuracy is used as the master reference flow rate controller, a highly stabilized flow rate control accuracy can be obtained even when the temperature or pressure of the fluid varies, thus making it possible that highly accurate and stable flow rate calibrations of the flow rare controller are performed compared to a conventional flow rate reference based on the buildup method, gas weight reduction method, or weight method.

Furthermore, the corrosion resistant reference pressure type flow rate controller used for the pressure control type flow rate reference of the present invention, includes a gold-plated layer formed on the entire inner wall surface that makes contact with the fluid of the reference pressure type flow rate controller which forms the pressure type flow rate reference, thus making it possible that flow rate calibrations on corrosive gases are performed more safely and accurately. For example, when it is used for flow rate calibrations of a flow rate controller used in a semiconductor manufacturing facility, remarkable quality improvements and reduction in manufacturing costs can be achieved.

BRIEF DESCRIPTION OF THE DRAWINGS

FIG. 1 depicts a block diagram of one embodiment of a pressure control type flow rate reference according to the present invention.

FIG. 2 is a diagram to show the results of a flow accuracy test (% F.S.) on the reference pressure type flow rate controller according to the present invention.

FIG. 3 is an explanatory drawing of a corrosion resistance test on the reference pressure type flow rate controller according to the present invention.

FIG. 4 is a diagram that shows changes in flow rate control error after the HBr gas was sealed for 24 hours without a gold-plated layer.

FIG. 5 is a diagram that shows changes in flow rate control error after the HBr gas was sealed for 24 hours with a gold-plated layer.

FIG. 6 is a diagram that shows the changes in flow rate control error after the HBr gas was sealed for 24 hours with a nickel-plated layer.

FIG. 7 is a diagram that shows the relationship between the number of corrections and the flow rate control accuracy of a reference pressure type flow rate controller.

FIG. 8 is an explanatory drawing of a flow rate calibration method based on the buildup method.

FIG. 9 is a diagram that shows one example of the rising rate of the chamber pressure with the buildup method.

FIG. 10 shows one example of flow rate measurement accuracy based on the buildup method.

FIG. 11 depicts a basic block diagram of a pressure type flow rate controller.

FIG. 12 depicts a vertical cross sectional schematic view of a pressure type flow rate controller.

BEST MODE FOR CARRYING OUT THE INVENTION

Preferred embodiments in accordance with the present invention are explained hereinafter with reference to drawings.

FIG. 1 is a block diagram of a pressure type flow rate control reference according to the present invention. The elements of FIG. 1 are as follows:
  1 designates a supply mouth of a calibration gas,
  2 designates a pressure controller,
  3 designates a first volume,
  4 designates a N2 gas supply mouth,
  5 designates a thermal type mass flow meter,
  6 designates a purge gas supply mouth,
  7 designates a purge gas discharge mouth,
  8 designates an uncalibrated flow rate controller
  9 designates a reference pressure type flow rate controller (a master pressure type flow rate controller),
  10 designates a second volume,
  11 designates a connection mouth of an evacuation device,
  12 designates a bypass circuit,
  13 designates a first connection mouth of an uncalibrated flow rate controller,
  14 designates a second connection mouth of an uncalibrated flow rate controller,
  AV1~AV26 signify opening/closing valves,
  F1 and F2 signify filters, and
  PT signifies a pressure detector.

A first volume 3 is provided to prevent the insufficient supply of pressure on the primary side of the uncalibrated flow rate controller 8, and second volume 10 is provided to prevent the pressure rise on the secondary side of the master pressure type flow rate controller 9. In the embodiments according to the present invention, containers having capacities of 1 liter to 3 liters are used.

The thermal type mass flow meter 5 is a preliminary flow rate controller for confirming whether there are substantial problems with the reference pressure type flow rate controller 9. In the embodiments of the present invention, two thermal type mass flow meters, 10 SLM and 200 SCCM, are used in parallel.

The reference pressure type flow rate controller 9 is made by combining a plurality of pressure type flow rate controllers in parallel so that a flow rate up to 10 SLM is covered with a set of 12 pressure type flow rate controllers.

To perform flow rate calibrations of an uncalibrated flow rate controller 8, an evacuation device, for example, a vacuum pump or a vacuum chamber (not illustrated) is connected to the connection mouth 11 of an evacuation device for evacuating the secondary side of the reference pressure type reference flow rate controller 9, the flow rate of the reference pressure type flow rate controller 9 is set in the vicinity of the rated flow rate of uncalibrated flow rate controller 8, and the open/close valves AV11~AV22 of the pressure type reference flow rate controller 9 are appropriately released.

Next, a calibration gas having a flow rate in the vicinity of the rated flow rate of the uncalibrated flow controller 8 is fed from calibration gas supply mouth 1 through pressure controller 2, a first volume 3, and thermal type mass flow meter 5. The readings of the reference pressure type flow rate controller 9 and the uncalibrated flow rate controller 8 are compared, to perform the flow rate calibrations of the uncalibrated flow rate controller 8.

After completing the flow rate calibrations at 100% F.S., the supply flow rate from the calibration gas supply mouth 1 is adjusted, and flow rates of both controllers 8 and 9 are compared at a certain set flow rate (% F.S.). While the flow rate calibrations are performed, the pressure P2 on the secondary side of a reference pressure type flow rate controller 9 is maintained at lower than ½ of the pressure P1 on the primary side thereof, and the pressure of the calibration gas passing through the orifice (not illustrated) of each pressure type flow rate controller 9 is the critical pressure.

FIG. 11 illustrates a block diagram of the reference pressure type flow rate controller 9 which has been disclosed as a pressure type flow rate controller in Japanese Patent No. 3580645, Japanese Unexamined Patent Application Publication No. 11-63265 and others. FIG. 12 illustrates some of the elements included in FIG. 11. The pressure type flow rate controller of FIG. 11 is constructed so that flow rate Qc=KP1 (where K is a constant determined by orifice OL) is computed in the computation control device H with the pressure P1 and gas temperature T on the primary side of an orifice OL, and the degree of opening of flow rate control valve CV adjusted so that the difference Qy=Qs−Qc of the set flow rate is zero. As shown in FIG. 12, members CV, H, P, T, OL, are assembled to be a pressure type flow rate controller.

Further, the pressure type flow rate controller is equipped with a mechanism with which so-called self-diagnosis of a flow rate is conducted by means of automatically detecting clogs in the output end of the flow rate output signal or orifice OL. (Japanese Unexamined Patent Application Publication No. 2000-137528)

As stated above, a pressure type flow rate controller has been disclosed. Therefore, the detailed explanation is omitted.

Compared to other types of flow rate controllers, such as, for example, thermal type flow rate controllers, measurement errors with fluctuation of temperature and pressure are relatively small with a pressure type flow rate controller. In addition, the controller itself is small-sized, and it enables various kinds of gases to be treated with the same controller. Therefore, it is the most suited for use as a flow rate control reference.

When reference pressure type flow rate controller 9 is used with a pressure control type flow rate reference according to the present invention, in order to improve the corrosion resistance, a 2~5 μm thick gold-plated layer is formed on the entire surface which comes in contact with the gas. Any method can be employed to form the gold-plated layer. However, in the present invention, a chemical plating method is employed to form a 2~3 μm thick gold-plated layer.

It is well known that corrosion resistance can be maintained with a gold-plated layer and the like. Thus, the inventors of the present invention have applied this fact to a pressure type flow rate controller having an orifice as one of the indispensable components by gold-plating the entire part making contact with the gas to improve corrosion resistance against all corrosive gases. Thus, clogging of the orifice, changes in bore size, deformation of the orifice and the like are prevented, allowing a high flow rate control accuracy to be maintained even when corrosive gases pass through the orifice. A corrosion resistant reference pressure type flow rate controller to be used with a pressure control type flow rate reference according to the present invention has been developed incorporating the above stated ideas.

A corrosion resistant reference pressure type flow rate controller (a master pressure type flow rate controller) 9 according to the present invention is characterized in that a 2~5 μm thick gold-plated layer is formed on the entire part such as the inner surface of a fluid passage coming in contact with a gas.

Table 1 shows one example of the major tests conducted on the corrosion resistant reference pressure type flow rate controller (a master pressure type flow rate controller) 9 and the evaluation criteria. Four corrosion resistant reference pressure type flow rate controllers 9 were used as test specimens.

TABLE 1

Test items and evaluation criteria

| | Test items | | Evaluation criteria |
|---|---|---|---|
| 2-1 | He leakage test | Sheet leakage | Within $2.0 \times 10^{-5}$ Pa m$^3$/sec |
| | | Outside leakage | Within $1.0 \times 10^{-10}$ Pa m$^3$/sec |
| | Pressurized leakage test | Valve seat leakage | No leakage |
| | | Pressure resistance & Air tightness | No leakage |
| 2-2 | Pressure indication test | | Pressure indication output is within ±25 mV |
| 2-3 | Flow rate accuracy test | | 0.1% F.S. (set value 1~10%) |
| | | | 1.0% F.S. (set value 10~100%) |
| 2-4 | Responsiveness test | | Within 0.5 sec up to ±2.0% of the set value (build up characteristic) |
| 2-5 | Flow rate self-diagnosis test | | Within ±3% of diagnosis results |
| 2-6 | Particle test | | Mean value of particles larger than 0.1 μm is one piece or less per one valve opening/closing |

Tables 2 through 5 show the results of the tests conducted in Table 1.

TABLE 2

Leakage test

| Test items | | Test specimen No. 1 | Test specimen No. 2 | Test specimen No. 3 | Test specimen No. 4 |
|---|---|---|---|---|---|
| He leakage test | Outside leakage | below the sensitivity | below the sensitivity | below the sensitivity | below the sensitivity |
| | Seat leakage ($Pa \cdot m^3/sec$) | $1.0 \times 10^{-06}$ | $4.4 \times 10^{-07}$ | $1.1 \times 10^{-09}$ | $1.6 \times 10^{-09}$ |
| Pressurized leakage test (1 MPa G) | Valve seat leakage Pressure Resistance & Air tightness | None Good | None Good | None Good | None Good |

TABLE 3

Flow rate accuracy (% F.S.)

| | Accuracy (% F.S.) | | | |
|---|---|---|---|---|
| | Test specimen No. 1 F600 | Test specimen No. 2 F600 | Test specimen No. 3 F450 | Test specimen No. 4 F500 |
| 0% | 0.01% | 0.01% | 0.01% | 0.01% |
| 3% | 0.01% | 0.04% | −0.04% | 0.00% |
| 5% | −0.03% | 0.01% | −0.04% | −0.01% |
| 7% | −0.06% | −0.07% | −0.04% | −0.01% |
| 10% | −0.02% | 0.01% | 0.02% | 0.04% |
| 50% | −0.01% | 0.02% | 0.09% | 0.04% |
| 100% | 0.01% | 0.01% | −0.04% | 0.00% |

TABLE 4

Flow rate accuracy (% S.P.)

| | Accuracy (% S.P.) | | | |
|---|---|---|---|---|
| | Test specimen No. 1 F600 | Test specimen No. 2 F600 | Test specimen No. 3 F450 | Test specimen No. 4 F500 |
| 0% | | | | |
| 3% | 0.41% | 1.17% | −1.21% | −0.15% |
| 5% | −0.54% | 0.16% | −0.76% | −0.11% |
| 7% | −0.79% | −1.04% | −0.59% | −0.08% |
| 10% | −0.20% | 0.12% | 0.17% | 0.36% |
| 50% | −0.02% | 0.04% | 0.18% | 0.09% |
| 100% | 0.01% | 0.01% | −0.04% | 0.00% |

The flow rate accuracy in the above Table 4 is graphically shown in FIG. 2.

TABLE 5

Particle test

| | Test specimen No. 1 | Test specimen No. 2 | Test specimen No. 3 | Test specimen No. 4 |
|---|---|---|---|---|
| Test in advance | 0 pc. | 0 pc. | 0 pc. | 0 pc. |

The following describes the method for conducting a corrosion resistance test for a corrosion resistant reference pressure type flow rate controller according to the present invention and test results.

FIG. 3 shows the steps included in a corrosion resistance test performed on a reference pressure type flow rate controller according to the present invention. A flow rate controller 9, which completed the accuracy verification tests (step 17) as shown in the above Tables 2 through 4, is left in a clean room for 24 hours (step 18), and then a cycle purge (step 19) is conducted with the N2 gas. After the gas is sealed for another 24 hours (step 20), a cycle purge (step 19) is conducted once again with the N2 gas. Then, a second accuracy verification test (step 17) is conducted, and the gas is flowed to the reference pressure type flow rate controller to be tested 9. The gas flowed out from the secondary side thereof is caught with a wafer, so that the contaminated metal may be examined with a metal contamination detecting device (step 21).

In the cycle purge (step 19), after the N2 gas is purged with a pressure of 0.1 MPa for 1 minute, the N2 gas having a pressure of 0.1 MPa is sealed and it is maintained in a vacuum for 10 seconds. This cycle of steps is continuously repeated over 10 times, and then the last purge is conducted for 1 minute with the N2 gas having the pressure of 0.1 MPa.

The cycle of corrosion resistance tests shown in FIG. 3 was continuously conducted using gases HCL, CL2, HBr and HF in that order. In other words, 4 cycles of tests were conducted by using 4 kinds of gases. In addition, the operation of treatments of the same contents thereof was conducted over 3 times.

FIG. 4 shows the change in flow rate control accuracy after conducting a corrosion resistance test with HBr sealed for 24 hours in a reference pressure type flow rate controller that has no gold-plating treatment. The test revealed that errors more than approximately 20 (% S.P.) are caused by clogging of the orifice due to the accumulation of corrosive products that occurred when the 24 hour-sealing of the HBr was performed without a gold-plated layer.

FIG. 5 shows the changes in flow rate accuracy before/after the 24 hour-sealing of the HBr gas into the corrosion resistant reference pressure type flow rate controller when a 2 μm thick gold-plated layer is formed. Comparing FIG. 5 with FIG. 4, shows that when a 2~5 μm thick gold-plated layer is formed, there is very little effect of corrosion caused by the HBr gas on the flow rate control accuracy when the flow rate is more than 20 (% S.P.).

Approximately 2~5 μm has been found to be a sufficient thickness of the gold-plated layer because not much improvement in corrosion resistance is seen when the thickness is made to be 5 μm or more, thus, it is not cost effective. Accordingly, it is desirable that the thickness of a gold-plated layer is made to be 2~5 μm.

Similarly, even though any method can be employed to form a gold-plated layer, a chemical plating method in which the plating solutions are used is recommended from the view point of the work process and the wide applicability to flow rate controllers.

The same corrosion resistance test was conducted on a reference pressure type flow rate controller having a gas contacting part formed with a 2 μm thick nickel-plated layer, replacing the gold-plated layer. FIG. 6 shows the results of the test. The test revealed that with a nickel-plated layer, the flow rate errors (% S.P.) were worse at −5% or so which is not enough for practical use.

Next, the relationship between the flow rate accuracy and the number of corrections in the low flow rate range of the corrosion resistant reference pressure type flow rate controller 9 was investigated.

With a pressure type flow rate controller, the flow rate of gas passing through the orifice becomes a value which is only related to the pressure P1 on the primary side of the orifice if the gas flow passing through the orifice is under the critical conditions and the shape of the orifice (the bore size and the form of the gas inlet side) remains unchanged. This makes it possible to obtain relatively stable flow rate control accuracy.

However, because the corrosive resistant reference pressure type flow rate controller 9 was expected to have a high control accuracy, for example, less than ±0.25% S.P. even with the low flow rate region of a set flow rate 1% or so for its use, whether or not such a high control accuracy can be obtained by means of repeating corrections was examined.

Table 6 shows the results of the test conducted on the number of corrections with a corrosion resistant reference pressure type flow rate controller 9 and a flow rate accuracy when the flow rate was set at 1% S.P. The results of the test are graphically shown in FIG. 7.

Table 6 The number of corrections and flow rate accuracy

| | The number of corrections Number of corrections | | | |
|---|---|---|---|---|
| | No correction | 1 | 2 | 3 |
| 3 σ | 0.441% | 0.057% | 0.024% | 0.036% |
| Mean value | −0.069% | 0.055% | 0.049% | −0.010% |

-continued

| | The number of corrections Number of corrections | | | |
|---|---|---|---|---|
| | No correction | 1 | 2 | 3 |
| Mean value + 3 σ | 0.372% | 0.112% | 0.073% | 0.026% |
| Mean value − 3 σ | −0.509% | −0.001% | 0.025% | −0.046% |

In Table 6 and FIG. 7, a is the standard deviation and error is shown by % F.S. As apparent from FIG. 7, the errors are constrained within ±1 digit=±10.065% F.S. by means of repeating corrections. As a result, it is evident that the corrosion resistant reference pressure type flow rate controller 9 on which the test was conducted is sufficiently provided with a flow rate control accuracy of ±10.25% S.P.

FEASIBILITY OF INDUSTRIAL USE

The pressure flow rate control type flow rate reference according to the present invention is applicable to all sorts of calibration references for flow rate controllers. The reference pressure type flow rate controller according to the present invention can be widely applied as a flow rate controller for appliances and devices for which corrosive gas is used.

What is claimed is:

1. A corrosion resistant reference pressure type flow rate controller to be used for a pressure type flow rate control reference, comprising:
   (a) an orifice;
   (b) a control valve provided on the upstream side of the orifice; and
   (c) a computation control device wherein a flow rate Q is computed by Equation Q=KP1, wherein K is a constant, and a pressure P1 is detected with a pressure detector, and the difference between a flow rate command signal Qs and the flow rate signal is made to be a control signal Qy that is outputted to a driving part of the control valve; wherein the pressure P1 on the upstream side of the orifice is adjusted by opening or closing of the control valve when the pressure P1 upstream of the orifice and a pressure P2 downstream of the orifice are maintained below a critical pressure ratio of a fluid to be controlled, thus controlling the flow rate Q of the fluid downstream of the orifice, and wherein a gold-plated layer is formed on an inner fluid contacting part of the reference pressure type flow rate controller.

2. The corrosion resistant reference pressure type flow rate controller according to claim 1, wherein the gold-plated layer is 2-5 μm thick.

* * * * *